WOMACK.
TROLLEY.
APPLICATION FILED APR. 5, 1919.
1,364,672. Patented Jan. 4, 1921.
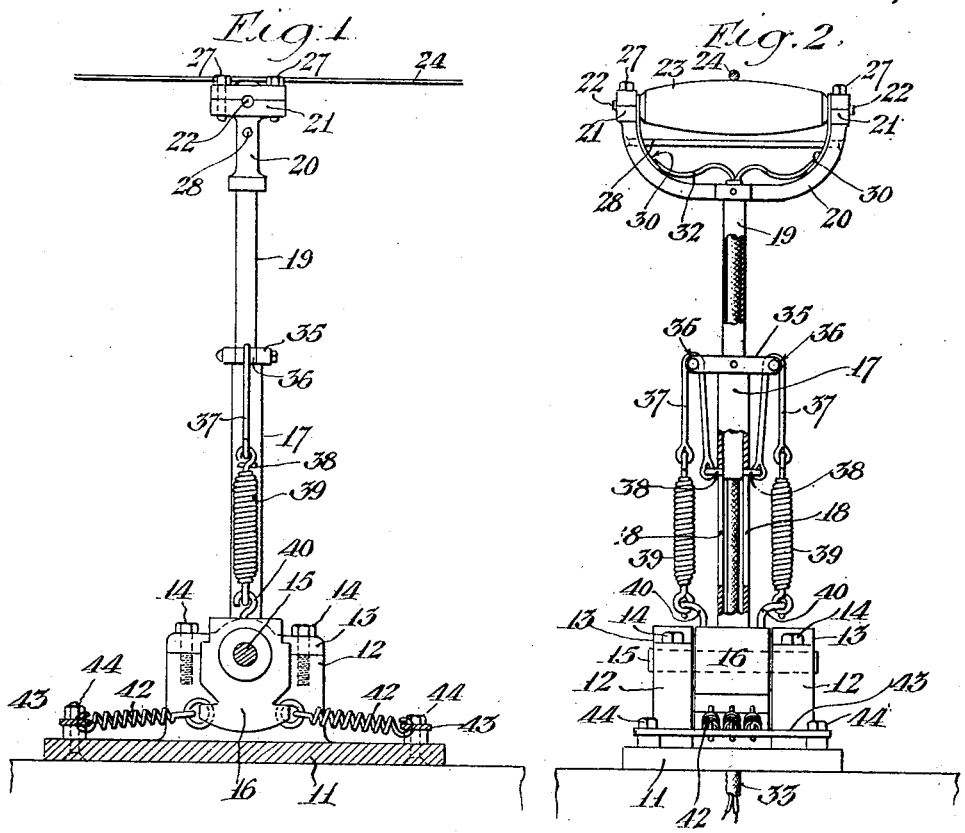
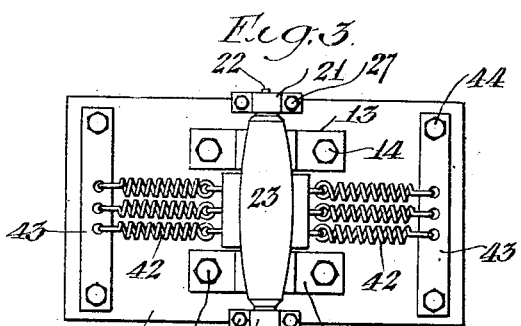
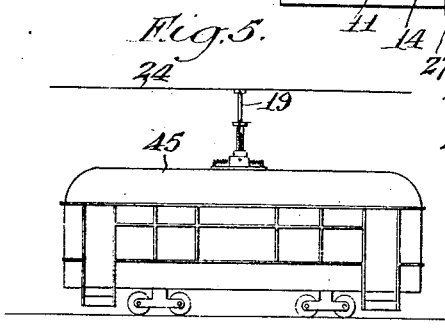
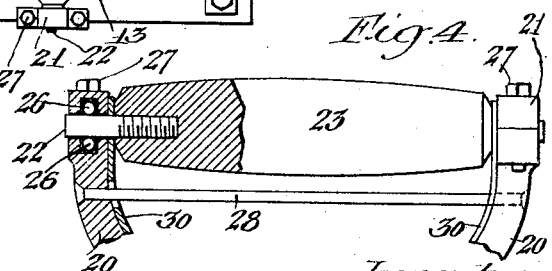
Inventor
Frank Womack
by Graham + Luvin
Attorneys

UNITED STATES PATENT OFFICE.

FRANK WOMACK, OF LOS ANGELES, CALIFORNIA, ASSIGNOR OF ONE-FOURTH TO MARY S. HANSEN, OF RICHVILLE, WASHINGTON, AND ONE-FOURTH TO LUTHER A. WOMACK, OF CHENEY, WASHINGTON.

TROLLEY.

1,364,672.  Specification of Letters Patent.  Patented Jan. 4, 1921.

Application filed April 5, 1919. Serial No. 287,889.

*To all whom it may concern:*

Be it known that I, FRANK WOMACK, a citizen of the United States, residing at Los Angeles, in the county of Los Angeles and State of California, have invented a new and useful Trolley, of which the following is a specification.

My invention relates to trolleys, of the class used on electric cars, for making contact with the overhead trolley wire, and the principal object of my invention is to produce a trolley of simple form and construction, which will readily adjust itself to different positions of the trolley wire and greatly reduce the liability of the trolley from becoming entangled with the overhead construction of the trolley wire system.

Other objects and advantages will appear hereinafter from the following specification.

Referring to the drawings, which are for illustrative purposes only,

Figure 1 is a side elevation partly in section of a trolley embodying a form of my invention.

Fig. 2 is a face view of the trolley shown in Fig. 1, part of the same being shown in section.

Fig. 3 is a plan view of the trolley.

Fig. 4 is an enlarged face view partly in section of a portion of the harp with the roller mounted therein, and Fig. 5 is a diagrammatic view of a trolley car showing the position of the trolley thereon.

In the form shown, 11 designates a base which is secured to the top of the car in any suitable manner, the base 11 having formed thereon two upright members 12, which together with a cap 13 secured to the members 12 by suitable bolts 14, constitute bearings for a shaft 15 upon which is mounted a block 16. Mounted in the top of the block 16 and extending upwardly therefrom is a hollow trolley standard 17, tubular in cross-section, and provided with vertical slots 18 formed therein.

Slidably mounted in the standard 17 is a trolley pole 19 to the upper end of which is secured in any suitable manner a trolley harp 20, such harp 20 having bearings 21 formed thereon which receive a shaft 22 of a roller 23 of suitable metal and which engages the trolley wire 24. The shaft 22 preferably runs in ball bearings indicated at 26, the bearings 21 being split and held together by means of suitable bolts 27. 28 designates a brace rod which extends across the arms of the harp, being riveted at its ends to prevent the harp from spreading. 30, 30 designate copper conductors which are arranged between the bearings on the harp and the roller 23, extending downwardly on the inside of the harp and having attached to their lower ends conductor wires 32, such wires extending downwardly through the hollow trolley pole and through the standard 17, such wires being covered with insulation as indicated at 33, it being the object of such wire construction to conduct the current from the trolley roller to the motor (not shown), instead of grounding the trolley pole as is commonly done.

The trolley is held upward against the trolley wire by means of the following construction:

35 designates a pulley hanger which is secured to the trolley pole 19 in any suitable manner, such hanger 35 having a roller 36 at each end thereof over which passes a flexible cable 37, one end of each flexible cable 37 being connected to an eye 38 mounted on the lower end of the trolley pole and extending through the slots 18 formed in the trolley standard, the other end of each cable 37 being connected to the upper end of a coiled spring 39, the lower end of each spring 39 being connected to an eye 40 secured in the top of the block 16. The block 16, trolley standard and trolley pole mounted thereon are elastically held in vertical position by means of coiled springs 42, the inner end of such springs being connected one to each side of the block 16 as clearly shown in Figs. 1 and 2, the outer end of such springs 42 being connected to a bar or plate 43 secured by means of suitable bolts 44 to the base 11, such base 11 being suitably mounted on the top of the trolley car 45, the springs 42 elastically holding the trolley in vertical position as shown.

From the above description and drawing it will be readily understood that the trolley stands in vertical position, the trolley pole being elastically held, due to the action of the springs 39, against the under side of the trolley wire. Any rocking of the car permits the trolley pole to adjust itself against the action of the springs 42, and any variation in the height of the wire from the top of the trolley car being compensated for by the action of the springs 39 which place an elastic tension upon the trolley pole to push the same upwardly with the roller against the wire. By using the form of roller shown it will be readily understood that such roller will not wear out as quickly as the ordinary form of grooved trolley wheel, and that having a wide bearing face, the danger of leaving the wires is reduced to a minimum.

My invention has a distinct advantage over trolley poles which depend for their adjusting upon compressed air as there is no liability of the mechanism freezing up as sometimes happens with air controlled trolleys.

I claim as my invention:—

1. A trolley comprising a base, a block journaled in the base, a hollow standard mounted in said block having slots formed in the opposite sides thereof, a hollow pole slidably mounted in said standard, attachment means on said pole extending and slidable in said slots, cables attached to said attachment means, rollers mounted on said standard for receiving said cables, coiled springs secured to said cables, means for attaching said springs to said block, a harp on the upper end of said pole, a roller mounted in said harp, springs secured to each side of said block, and means for securing said springs to said base, said attachment means limiting the longitudinal movement of the pole in the standard by engagement with the ends of the slots.

2. A trolley comprising a base, a shaft mounted in said base, a block mounted on said shaft, coiled springs secured at one end to the opposite sides of said block, means for securing the other end of said springs to said base, a hollow standard mounted on said block having vertical slots therein, a trolley pole slidably mounted in said standard, eye bolts on said pole extending through the slots in the standard, a harp mounted on the upper end of said pole, a roller mounted in said harp, and elastic means for moving said pole upwardly, said elastic means consisting of coiled springs attached at one end to said block, rollers mounted on said standard, and cables extending over said rollers having one end secured to said springs and the other secured to said eye bolts.

In testimony whereof, I have hereunto set my hand at Los Angeles, California, this 29th day of March, 1919.

FRANK WOMACK.